(12) United States Patent
Chang et al.

(10) Patent No.: US 6,985,180 B2
(45) Date of Patent: Jan. 10, 2006

(54) INTELLIGENT BLEMISH CONTROL ALGORITHM AND APPARATUS

(75) Inventors: Michael Chang, San Jose, CA (US);
Allan Yeh, San Jose, CA (US);
Kou-Hu Tzou, San Jose, CA (US)

(73) Assignee: ESS Technology, Inc., Fremont, CA (US)

( * ) Notice: Subject to any disclaimer, the term of this patent is extended or adjusted under 35 U.S.C. 154(b) by 679 days.

(21) Appl. No.: 09/884,284

(22) Filed: Jun. 19, 2001

(65) Prior Publication Data
US 2002/0196354 A1   Dec. 26, 2002

(51) Int. Cl.
H04N 9/64   (2006.01)
(52) U.S. Cl. ..................................... 348/246
(58) Field of Classification Search ............. 348/241, 348/246, 247, 272, 273, 279
See application file for complete search history.

(56) References Cited

U.S. PATENT DOCUMENTS

| | | | |
|---|---|---|---|
| 4,189,751 A | * | 2/1980 | Nagumo .................. 348/246 |
| 5,008,739 A | | 4/1991 | D'Luna et al. |
| 5,805,216 A | * | 9/1998 | Tabei et al. ............. 348/246 |
| 5,920,344 A | | 7/1999 | Kim |
| 5,995,675 A | | 11/1999 | Hwang |
| 6,181,376 B1 | | 1/2001 | Rashkovskiy et al. |
| 6,188,804 B1 | | 2/2001 | Weldy et al. |
| 6,307,393 B1 | * | 10/2001 | Shimura ................... 324/765 |
| 6,768,513 B1 | * | 7/2004 | Watanabe et al. ........ 348/246 |
| 2001/0052938 A1 | * | 12/2001 | Itoh ........................ 348/246 |
| 2002/0158977 A1 | * | 10/2002 | Hamilton, Jr. ........... 348/246 |

FOREIGN PATENT DOCUMENTS

| | | | |
|---|---|---|---|
| JP | 61261974 A | * | 11/1986 |
| JP | 06205302 A | * | 7/1994 |
| JP | 06245148 A | * | 9/1994 |

OTHER PUBLICATIONS

Tan, Yap-Peng et al., "A Robust Sequential Approach for the Detection of Defective Pixels in An Image Sensor," Proceedings of IEEE Conf. on Acoustics, Speech and Signal Processing, 4:2239-2242, Mar. 1999.

Illgner, Klaus et al., "Programmable DSP Platform for Digital Still Cameras," Proceedings of International Conference on Acoustics Speech and Signal Processing, 4 pp, Mar. 1999.

* cited by examiner

Primary Examiner—Aung Moe
Assistant Examiner—Timothy J. Henn
(74) Attorney, Agent, or Firm—Farjami & Farjami LLP

(57) ABSTRACT

An image processing method and apparatus is described for processing a signal from a monochrome or color sensor that may be subject to pixel defects or blemishes. Without prior knowledge of any pixel defects, the processing method examines each pixel value and its neighboring pixel values. A number of tests are applied to the set of pixel values to determine whether the underlying pixel is defective. If the underlying pixel is determined to be defective, the pixel value is replaced by an estimate value derived from the values of its neighboring pixels. Otherwise, the pixel value remains intact.

26 Claims, 5 Drawing Sheets

INTELLIGENT BLEMISH CONTROL ALGORITHM AND APPARATUS

BACKGROUND OF THE INVENTION

1. Field of the Invention

The invention relates to the field of digital image processing and more specifically to blemish control in solid-state CCD/CMOS sensors that are subject to pixel defects.

2. Description Relative to the Prior Art

Pixel defects in solid-state sensors such as CCD/CMOS sensors have been a common problem. The output from a CCD/CMOS sensor is subject to artifacts due to bad pixels. The visual effect of bad pixels can be very annoying as bad pixels manifest as black, white or gray dots in captured images. With sensor sizes increasing into the mega-pixel range, pixel defects are almost inevitable. Because it is very hard to produce defect-free sensors, it has been common practice for CCD/CMOS sensor manufacturers to market sensors with a small amount of defective pixels. These slightly defective sensors are often shipped with a record listing the locations of defective pixels.

Sensors with a slight defect might be tolerable for some applications if care is taken to mitigate the effect of impairment. A common solution to mitigate the effect of pixel defects involves the registration of the bad pixel locations before the product is shipped and involves an algorithm to produce the proper pixel value for the corresponding bad pixels of the captured image. For example, Kodak, a sensor manufacturer, is marketing its sensors with various defect classes ranging from defect free to some point defects, cluster defects and column defects. Because the locations of bad pixels are random, a record of these locations must be kept with each individual device. Usually, the record is transferred to non-volatile memory in the sensor device. If the record is lost, however, the sensor device must be re-tested to obtain the locations of the bad pixels. Once the locations of the bad pixels are known, the corresponding pixel values should be replaced by values estimated from surrounding pixel values. Interpolation can be used to obtain the estimated values.

Pixel defects can be classified in a variety of ways. According to one model, there are three types of pixel defects: stuck high, stuck low and abnormal sensitivity. When a pixel is stuck high (white pixel), its output is always very high regardless the input light intensity. When a pixel is stuck low (dark pixel), its output is always very low regardless of the input light intensity. The pixel subject to abnormal sensitivity produces an output level different from (higher or lower than) the normal pixels by a certain amount. To further illustrate, a pixel with the stuck high defect manifests itself as a very noticeable artifact (bright spot in a gray or dark area), which is most visually objectionable in a gray or dark area, particularly in a monochrome sensor. A pixel with stuck-low defect also produces a noticeable artifact (dark spot in a gray or bright area). A pixel with the abnormal-sensitivity defect is relatively more tolerable.

Another traditional method of dealing with the defective pixels involves a defect table with predetermined locations of the defective pixels. A description of this method can be found in U.S. Pat. No. 5,008,739, "Real-Time Digital Processor for Producing Full Resolution Color Signals from a Multi-Color Image Sensor," by Hibbard. In that disclosure, a defect concealment circuit is incorporated to estimate the values for defective pixels, the locations of which are predetermined and placed in a defect table (column 6, line 39).

Another existing system to cope with the bad sensor pixels involves the application of a sequence of random test pictures. After each test picture is captured, each pixel of the sensor is compared to its neighboring pixels. Applying a function (see below), statistical data is collected to determine whether a pixel is defective. The probability of finding pixel defects increases as more test pictures are used. This method was developed by Y-P Tan and T. Acharya. This system is described in more detail in "A Robust Sequential Approach for the Detection of Defective Pixels in an Image Sensor," published in Proceedings of IEEE Conference on Acoustics, Speech and Signal Processing, vol. 4, pp. 2239–2242, March 1999. A minimum neighboring pixel difference (MND) is calculated as:

$$y(i,j) = \min\{|I(i,j)-I(m,n)|\} \text{ for} (m,n) \in G(i,j)$$

where $G(i,j)$ denotes the locations of the pixels within the neighboring support around pixel $(i,j)$. $I(i,j)$ is the output of pixel $(i,j)$, and $I(m,n)$ is the output pixel at $(m,n)$. They examine the conditional probability density function $p(y/z)$, where $z$ is the pixel value from the neighborhood of $(i,j)$ that results in the MND for the underlying pixel $y$. The conditional probability density function exhibits very distinctive characteristics between a normal pixel and a defective pixel. When enough statistical data is collected for each pixel location, a fairly accurate decision can be made as to whether an underlying pixel has a defect, and the type of defect if it is defective. Based on simulation, they concluded that accurate defect detection could be made with a training process where sequence of 8 random test pictures is applied to the function described above. Though the method can result in accurate defect detection, it relies on the training process to form the conditional probability density function. This process may not be desirable.

Another method to alleviate the effect of defective pixels involves applying signal processing to every pixel. Proper pixel values are extrapolated from the values of neighboring pixels. The method is applied globally to all pixels whether defective or not. This method was developed by B. Dierickx and G. Meynants in "Missing Pixel Correction Algorithm for Image Sensor," published in Proceedings of SPIE, vol. 3410, pp. 200–203, May 1998. The assumption is that an image projected through a lens or any other optical system is never perfectly sharp. Even with ideal lenses, a star image, for example, would not be projected on a single pixel. The point-like source of the star would be smeared out over a central pixel and a few neighbors. To correct the possible defective pixel, they examine 4 pixels surrounding an underlying pixel (one-dimensional processing). They form an extrapolated value for the underlying pixel from the 2 pixels on the left and the 2 pixels on the right.

The upper bound, $C_{max}$, for the underlying pixel is defined as the maximum value among the 2 extrapolated values and the two immediate neighboring pixel values. The lower bound, $C_{min}$, for the underlying pixel is defined as the minimum value among the 2 extrapolated values and the two immediate neighboring pixel values. The final corrected value for the underlying pixel is the median of $C_{max}$, $C_{min}$, and the original underlying pixel value. The signal processing is applied to every pixel whether it is defective or not. Though the method does a fairly good job alleviating the effect of defective pixels, some subtle features, however, may be altered inadvertently. This occurs because even all pixels are fixed, even good pixels.

A few US Patents granted in recent years relate to missing pixel processing for color image sensors. These patents, however, deal with an issue very different from the present invention. For example, U.S. Pat. Nos. 6,181,376 and 6,188,804 are directed to a full reconstruction of a sampled image which has missing information. In this case, the sensor does not provide full resolution samples. One such example is the Bayer pattern (RGB sampling pattern) where each line contains either R-G pixels or G-B pixels. The G pixel pattern thus represents 50% of the total pixels and each of the R and B pixels represent 25% of the total pixels. These two patents address the method of interpolating the values for the missing color pixels.

If the locations of defective pixels are known, a simple interpolation would generally do a decent job. In such a scenario, when a slightly defective sensor is incorporated into an imaging system, a simple pixel interpolation can be applied to the defective locations. This simple method can effectively reduce the artifacts caused by bad pixels. However, a defective pixel detection algorithm can result in false detections where a normal pixel is classified as a defective pixel. Moreover, the probability of false detections increases as sensor sizes increase.

A need therefore remains for an image processing method and apparatus that detects and identifies pixel defects without prior knowledge of such defects and restores the values of defective pixels in a manner that is time efficient, simple, and reliable. A need also remains for a method and apparatus that minimizes the occurrence of false detections.

SUMMARY OF THE INVENTION

An intelligent control circuit for pixel defects in a sensor, the control circuit including a defective pixel detection circuit for detecting whether an underlying pixel is defective; and a pixel value restoration circuit for replacing the value of the underlying pixel, if defective, with a restoration value derived from the values of neighboring pixels; wherein the control circuit operates in real-time.

The intelligent control circuit applies at least one of three tests to determine whether an underlying pixel has one of three types of defects: stuck high, stuck low and abnormal sensitivity. In one embodiment, the intelligent control circuit compares the value of the underlying pixel to the values of a first group of neighboring pixels for a stuck high test and for a stuck low test, and compares the value of the underlying pixel to the values of a second group of neighboring pixels for a abnormal sensitivity test. In one embodiment, the first group includes the pixels immediately surrounding the underlying pixel, and the second group includes the pixels immediately surrounding and including the first group. If a defect is found, the intelligent control circuit detects whether a line or an edge feature passes through the underlying pixel. The intelligent control circuit then replaces the value of the underlying pixel with a restoration value that is derived from the neighboring pixels. To derive the restoration value, the intelligent control circuit applies a spatially adaptive interpolation which involves either a one- or two-dimensional interpolation depending on whether or not a line or an edge feature passes through the underlying pixel, respectively.

Embodiments of the present invention achieve their purposes and benefits in the context of known circuit technology and known techniques in the electronic arts. Further understanding, however, of the nature, objects, features, and advantages of the present invention is realized by reference to the latter portions of the specification, accompanying drawings, and appended claims. Other objects, features, and advantages of the present invention will become apparent upon consideration of the following detailed description, accompanying drawings, and appended claims.

DESCRIPTION OF THE SPECIFIC EMBODIMENTS

With reference to the drawings, embodiments of an image processing method and apparatus, according to the present invention, is described below.

Figure 1:
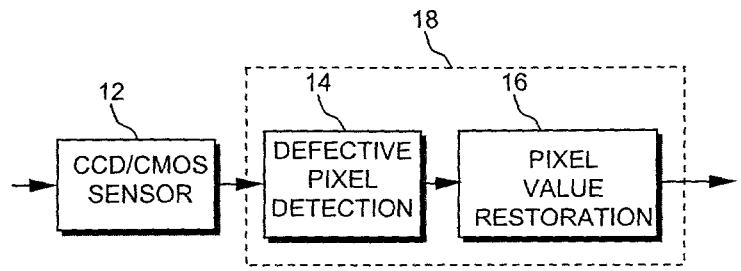
FIG. 1 shows a simplified high-level block diagram of an image processing unit that contains the main functional elements required to implement a blemish control algorithm, according to an embodiment of the present invention.

FIG. 1 shows a simplified high-level block diagram of an image processing unit 18, also referred to as an intelligent control circuit, that contains the main functional elements required to implement a blemish control algorithm, according to embodiments of the present invention. Image processing unit 18 includes a defective pixel detection stage 14 and a pixel value restoration stage 16. An output from a CCD/CMOS sensor device 12 feeds into image processing unit 18. Image processing unit 18 can operate with a CCD/CMOS sensor device in real-time, i.e., each time the CCD/CMOS feeds a new image to image processing unit 18. This means that image processing unit 18 can operate in the field well after such a sensor has been manufactured and placed into products.

In operation, defective pixel detection stage 14 examines each pixel and its surrounding pixels, also referred to as neighboring pixels. Defective pixel detection stage 14 then determines whether each underlying pixel is defective. Defective pixel detection stage 14 can apply three tests to determine the type defect, e.g., whether the pixel is stuck low, stuck high, or abnormally sensitive, one test for each type of defect. If a defect is found, pixel value restoration stage 16 detects whether a line or an edge feature passes through the underlying pixel. Pixel value restoration stage 16 then replaces any defective pixel to a proper value, also referred to as a restoration value. This restoration value is derived from the neighboring pixels. These steps are described in more detail below.

Figure 2:
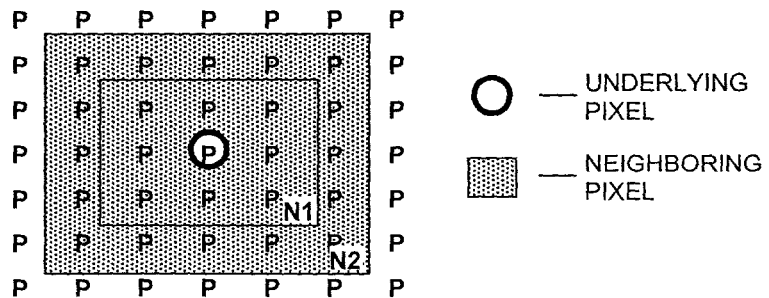
FIG. 2 shows a depiction of an array of monochrome sensor elements with an underlying pixel circled and the neighboring pixels shown in the shaded area.

FIG. 2 shows a depiction of an array of monochrome sensor elements with an underlying pixel circled and the neighboring pixels shown in the shaded area. In this particular depiction, the pixels are for a monochrome sensor. In some embodiments, the neighboring pixels are divided into at least two groups, or tiers. Referring still to FIG. 2, the pixels in the surrounding area are divided into two tiers N1 and N2. Tier N1 includes the pixels immediately surrounding the underlying pixel. Tier N2 includes the pixels of tier N1 and the pixels immediately surrounding tier N1. The present invention is not limited to two tiers. For example, there could be a third tier that includes pixels immediately surrounding tier N2, and so on. Moreover, the shape of the tiers will vary depending on the specific application. For instance, the tiers need not be rectangular. A diamond shaped area is also a reasonable choice for the surrounding area.

Figure 3:
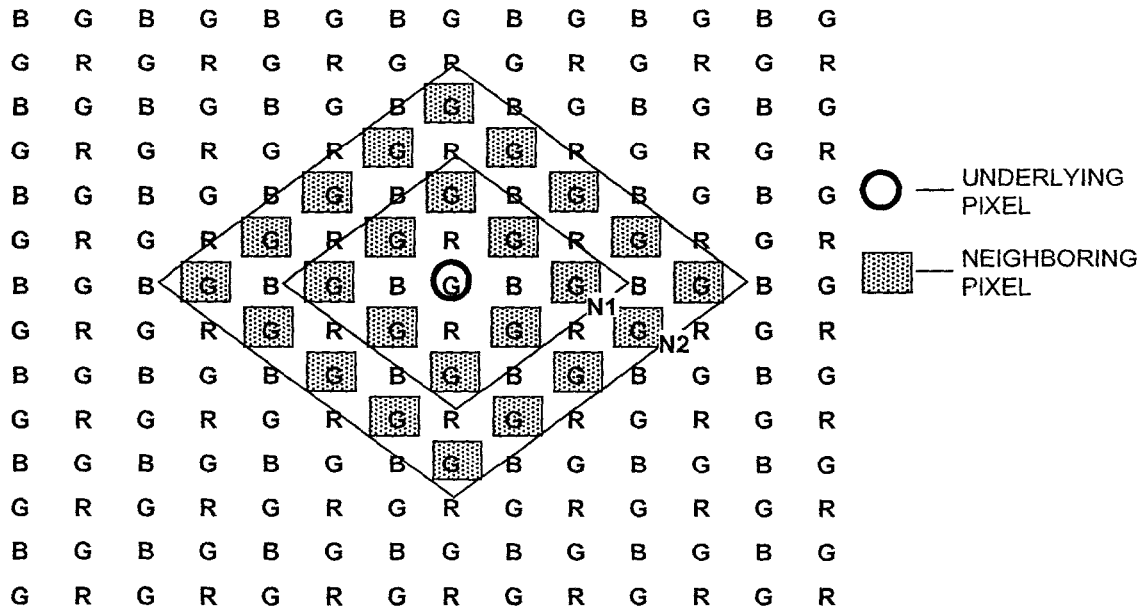
FIG. 3 shows a depiction of an array of color sensor elements with the underlying green pixels circled and the neighboring green pixels shown in the shaded area.

FIG. 3 shows a depiction of an array of color sensor elements with the underlying green pixels circled and the neighboring green pixels shown in the shaded area. Here, the neighboring pixels form a diamond shape. Moreover, the size of the surrounding area can vary depending on the specific application. A smaller area that only includes eight of the immediate pixels could be a reasonable choice.

According to the present invention, the pixels can be allocated to different tiers in a variety of ways depending on the specific application. Moreover, embodiments of the blemish control algorithm can adapt to various patterns. For example, it can be applied to the Bayer pattern which is typically used for color CCD/CMOS sensors. The Bayer pattern is widely used and is well known in the art. It is disclosed in U.S. Pat. No. 3,971,065, issued to B. E. Bayer. According to the pattern, the RGB color elements form a checker board pattern.

Figure 4:
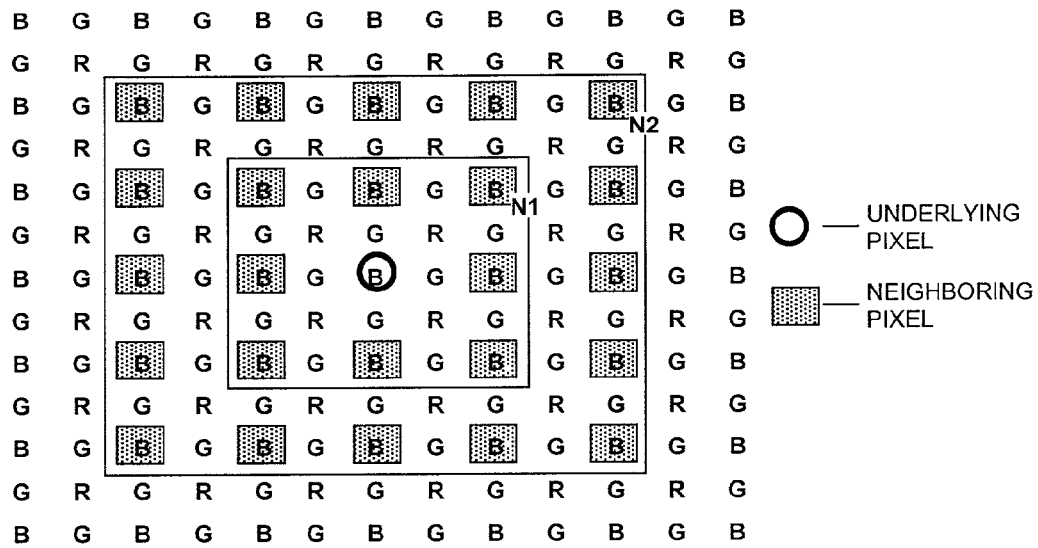
FIG. 4 shows a depiction of an array of color sensor elements with the underlying blue pixels circled and the neighboring blue pixels shown in the shaded area.
Figure 5:
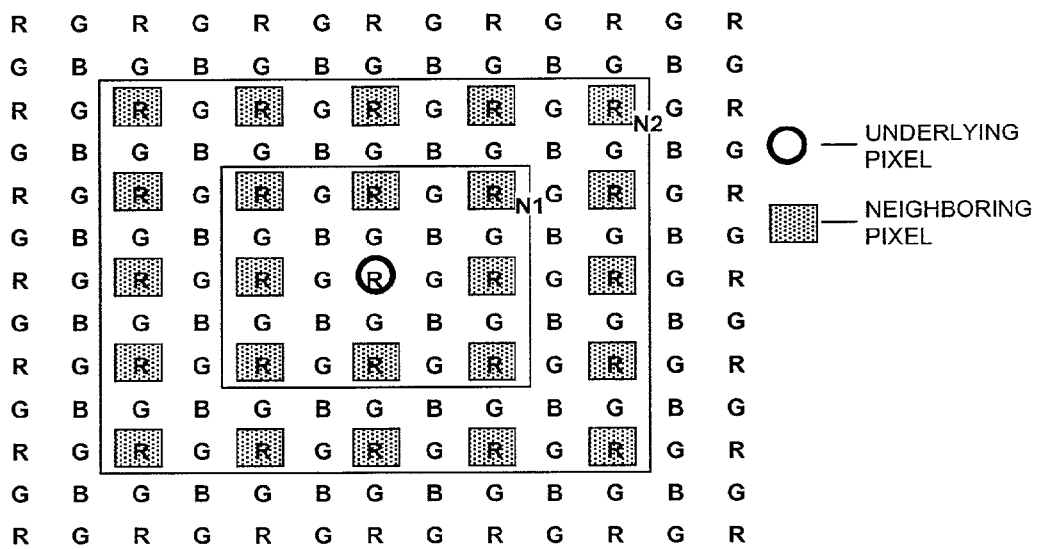
FIG. 5 shows a depiction of an array of color sensor elements with the underlying red pixels circled and the neighboring red pixels shown in the shaded area.

FIG. 4 shows a depiction of an array of color sensor elements with the underlying blue pixels circled and the neighboring blue pixels shown in the shaded area. FIG. 5 shows a depiction of an array of color sensor elements with the underlying red pixels circled and the neighboring red pixels shown in the shaded area. It is to be understood that the shape, size, and pattern of the tiers described are merely examples and should not limit the scope of the claims herein. In light of the present invention, one of ordinary skill in the art would recognize many other variations, modifications, and alternatives.

When determining whether an underlying pixel is defective, each group is processed separately. The intelligent control circuit compares the value of the underlying pixel to the values of a first group of neighboring pixels for a stuck high test and for a stuck low test, and compares the value of the underlying pixel to the values of a second group of neighboring pixels for a abnormal sensitivity test.

In one embodiment, the blemish algorithm processes the pixels of tier N1 first. If a defect is found, the underlying pixel is then processed by the pixel value restoration stage (described below). If no defect is found, the blemish algorithm then processes the pixels of tier N2. This specific order is rather efficient because tier N1 has fewer pixels than does tier N2 making the processing faster. Also, in some embodiments, the stuck high and stuck low tests are applied to the pixels of tier N1 and the abnormally sensitive test is applied to the pixels of tier N2. The specific order and steps will depend on the application. In light of the present invention, one of ordinary skill in the art would recognize many other variations, modifications, and alternatives. For example, in other embodiments, both tiers could be processed for detection of a first type of defect before any tier is processed for a second type of defect. In yet other embodiments, for example, tiers N1 and N2 could be processes in parallel.

Figure 6:
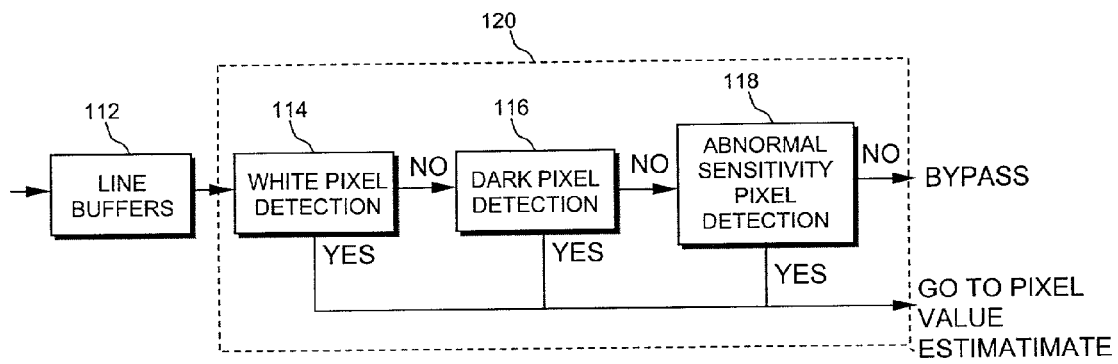
FIG. 6 shows a simplified high-level block diagram detailing the defective pixel detection stage of FIG. 1.

FIG. 6 shows a simplified high-level block diagram detailing the defective pixel detection 14 stage of FIG. 1 (labeled 120 in FIG. 6). Defective pixel detection stage 120 couples to line buffers 112. Line buffers 112 serve as a temporary holding place for the lines around an underlying pixel. For the example, in FIG. 2, a total of five line buffers would be required. In FIG. 3, a total of nine line buffers would be required. In FIGS. 4 and 5, a total of five line buffers would be required.

Defective pixel detection stage 120 includes three processing stages: a white pixel detection stage 114, a dark pixel detection stage 116, and an abnormal sensitivity pixel detection stage 118. In the specific embodiment of FIG. 6, the three processing stages are shown in a tandem arrangement. They can, however, be in other arrangements, such as in a parallel arrangement, where a more efficient for hardware implementation such as a logic OR circuit can be used to combine the three results.

In operation, each underlying pixel is tested for each type of defect. In some embodiments, each underlying pixel is tested in the following order: stuck high, stuck low, and then abnormal sensitivity. The order of course can vary depending on the specific application. For example, another order of testing could be to first test for a stuck low defect, then a stuck high defect, then an abnormal sensitivity defect. Other orders of testing might be appropriate for some applications depending on the specific application.

It is to be understood that the implementation of FIG. 6 is merely an example and should not limit the scope of the claims herein. In light of the present invention, one of ordinary skill in the art would recognize many other variations, modifications, and alternatives. Also, the described system and method can be implemented in a multitude of different forms (i.e., software, hardware, or a combination of both) in a variety of systems.

Figure 7:
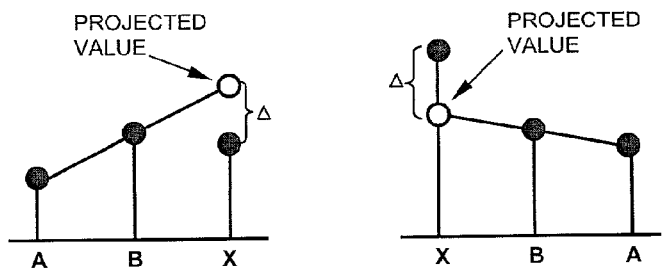
FIG. 7 shows a depiction of linear extrapolation for one-dimensional data.

FIG. 7 shows a depiction of linear extrapolation for one-dimensional data. The white pixel detection stage 114 compares the value $I_p$ of the underlying pixel with a threshold value White_Thresh. If $I_p$>White_Thresh, the white pixel detection stage 114 performs the following calculation:

Min_Diff=min($|I_p-I(x)|$) for all x∈N1

The Min_Diff is then compared with a threshold value, white_Diff_Thresh. If

Min_Diff>White_Diff_Thresh, the underlying pixel is declared to be a white pixel.

If the underlying pixel is not a white pixel, the dark pixel detection is performed. The dark pixel detection stage 116 compares the value $I_p$ of the underlying pixel with a threshold value Dark_Thresh. If $I_p$<Dark_Thresh, the dark pixel detection stage 116 performs the following calculation:

Min_Diff=min($|I_p-I(x)|$) for all x∈N1

The Min_Diff is then compared with a threshold value, Dark_Diff_Thresh. If

Min_Diff>Dark_Diff_Thresh the underlying pixel is declared to be a dark pixel. The abnormal sensitivity pixel detection stage 118 uses an extrapolation method to compare the underlying pixel value and the projected value. If the underlying pixel value varies from the projected value beyond a certain percentage, the underlying pixel is declared to be an abnormal pixel. For the one-dimensional case, a simple linear extrapolation is illustrated in FIG. 7. Let $I_A$, $I_B$, and $I_P$ be the pixel values for A, B, and P respectively. The projected value, $\hat{I}_P$ based on A and B using the linear extrapolation method is:

$$\hat{I}_P = 2I_B - I_A.$$

We extend this one-dimensional extrapolation to a simplified two-dimensional extrapolation as:

$$\hat{I}_P = 2\left(\frac{1}{8}\sum_{x \in N1} I_x\right) - \left(\frac{1}{16}\sum_{x \in N2, x \notin N1} I_x\right)$$

If $(|\hat{I}_{P-IP}|/\hat{I}_P)$>Thresh_AS, the underlying pixel is declared as an abnormal sensitivity pixel, where Thresh_AS is the threshold value.

At the output of the defective pixel detection stage 120, all pixels are determined whether they are defective or not. Pixels determined to be defective, they undergo pixel value restoration stage 16 (FIG. 1). Normal pixels bypass pixel value restoration stage 16.

Figure 8:
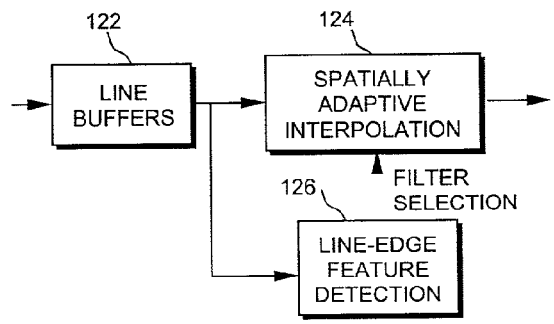
FIG. 8 shows a simplified high-level block diagram detailing the pixel value restoration stage of FIG. 1.

FIG. 8 shows a simplified high-level block diagram detailing the pixel value restoration stage 16 of FIG. 1. The pixel value restoration stage couples to line buffers 122. Line buffers 122 serve as a temporary holding place for the lines around an underlying pixel. The pixel value restoration stage includes a spatially adaptive interpolation stage 124 and line-edge feature detection stage 126. Stages 124 and 126 involve the neighboring pixels, i.e., the pixels surrounding an underlying pixel. Line buffers 122 are thus required. Line buffers 122 (as well as line buffers 112 of FIG. 6) can share the same memory.

Generally, to derive a restoration value, the intelligent control circuit applies a spatially adaptive interpolation which involves either a one- or two-dimensional interpolation depending on whether or not a line or an edge feature passes through the underlying pixel, respectively. To apply a spatially adaptive interpolation, it must first be known whether a line or edge feature passes through the underlying pixel. There are some known techniques for detecting lines and edges, see *Digital Image Processing*, by R. C. Gonzalez and R. E. Woods, Addison-Wesley:Reading, Mass., 1992. If no line or edge feature is detected, the underlying pixel is likely in a smooth area. A regular two-dimensional linear interpolation would be sufficient. Regular (two-dimensional) image interpolation performs adequately for smooth areas. However, it often softens or smears sharp edges.

To determine whether a line or edge feature passes through an underlying pixel, a line-edge feature algorithm, according to the present invention is invoked. In a specific embodiment, one-dimensional interpolation is applied on the 4 neighboring pixels along the diagonal direction where a line or edge feature is detected. A properly designed algorithm for defective-pixel detection will lead to a small percentage of pixels being classified as defective. The majority of the pixels will not be affective by subsequent interpolation. Among the small percentage of pixels classified as defective, some of them might be misclassified. Nevertheless, the spatially adaptive interpolation (described below) should have little inadvertent effect. As a matter of fact, spatially adaptive interpolation can even enhance the picture quality.

Figure 9:
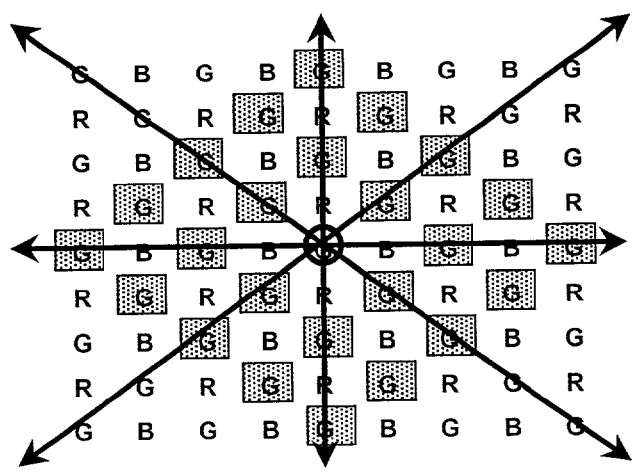
FIG. 9 shows a depiction of four possible feature lines passing through an underlying green pixel.
Figure 10:
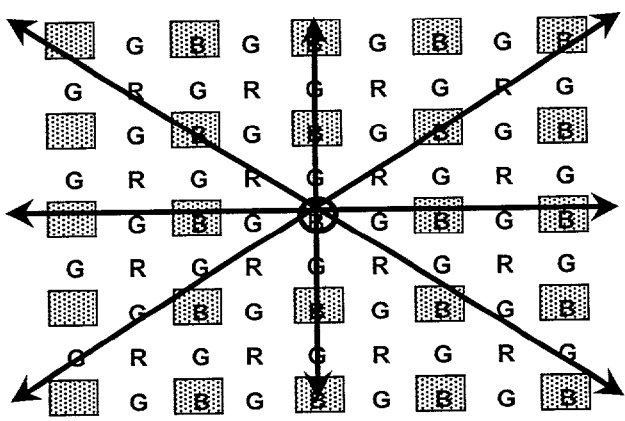
FIG. 10 shows a depiction of four possible feature lines passing through an underlying blue pixel.
Figure 11:
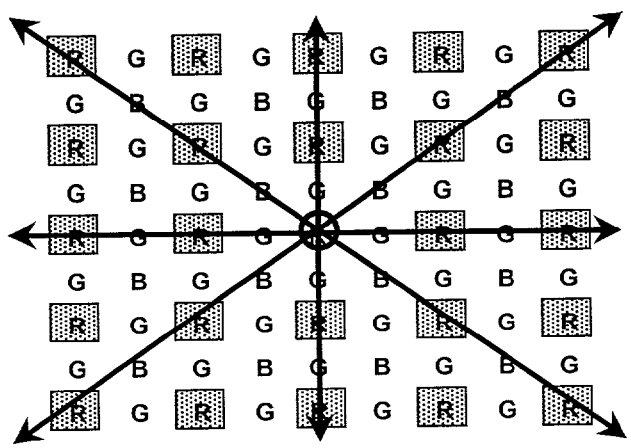
FIG. 11 shows a depiction of four possible feature lines passing through an underlying red pixel.

Once it is determined whether a line or edge feature passes through an underlying pixel, a spatially adaptive interpolation filter is then applied accordingly. FIGS. 9, 10 and 11 each show a depiction of four possible feature lines passing through an underlying green pixel, blue pixel and red pixel, respectively. In some embodiments, a technique using a 5×5 mask is adopted. The line and edge features in four different orientations, as shown in FIGS. 9, 10 and 11 for green, blue and red pixels respectively, are tested.

Figure 12:
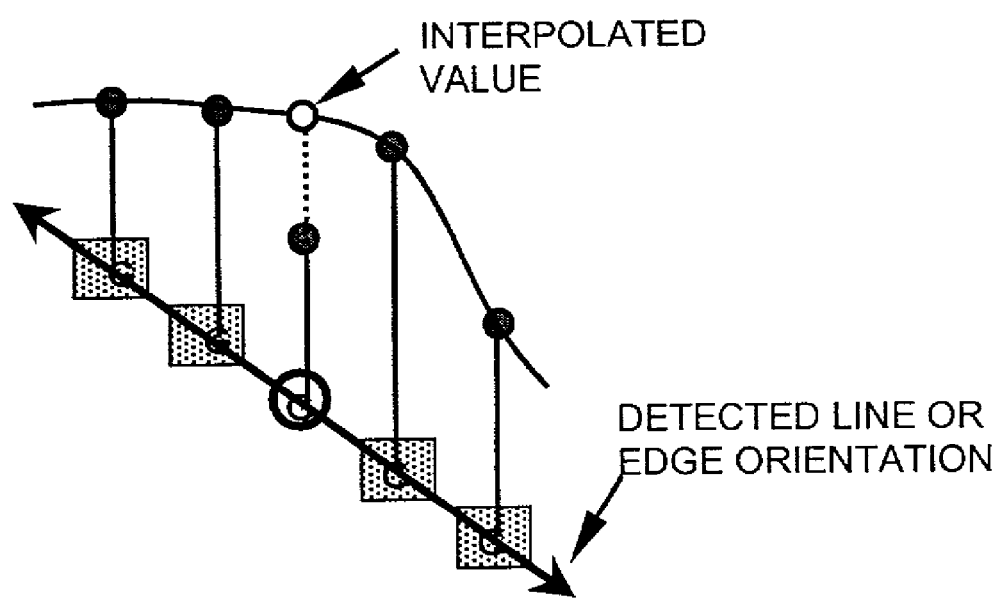
FIG. 12 shows a depiction of spatially adaptive interpolation along the direction of detected line or edge.

FIG. 12 shows a depiction of spatially adaptive interpolation along the direction of detected line or edge. If a line or edge feature is detected, a one-dimensional interpolation is applied along the direction of the detected line or edge. The actual direction will depend on the specific image texture around the underlying pixel. As a result, spatially adaptive interpolation of the present invention restores the values of defective pixels while preserving the sharpness of images. Moreover, spatially adaptive interpolation stage 124 minimizes potential artifacts caused by interpolation on normal pixels.

CONCLUSION

In conclusion, it can be seen that embodiments of the present invention provide numerous advantages. Principally, they mitigate problems associated with defective pixels in an efficient and reliable manner without the prior knowledge of the locations and the number of defective pixels. Specific embodiments of the present invention are presented above for purposes of illustration and description. The full description will enable others skilled in the art to best utilize and practice the invention in various embodiments and with various modifications suited to particular uses. After reading and understanding the present disclosure, many modifications, variations, alternatives, and equivalents will be apparent to a person skilled in the art and are intended to be within the scope of this invention. Moreover, the described circuits and method can be implemented in a multitude of different forms such as software, hardware, or a combination of both in a variety of systems. Therefore, it is not intended to be exhaustive or to limit the invention to the specific embodiments described, but is intended to be accorded the widest scope consistent with the principles and novel features disclosed herein, and as defined by the following claims.

What is claimed is:

1. An intelligent control circuit for processing pixel defects in a sensor, the control circuit comprising:
   a defective pixel detection circuit for detecting whether an underlying pixel is defective; and
   a pixel value restoration circuit for replacing a value of the underlying pixel, if defective, with a restoration value derived from values of neighboring pixels;
   wherein the control circuit operates in real-time; and
   wherein the defective pixel detection circuit comprises:
   a white pixel detection circuit for detecting stuck high defects;
   a dark pixel detection circuit for detecting stuck low defects; and
   an abnormal sensitivity detection circuit for detecting abnormal sensitivity defects.

2. The method of claim 1 wherein the underlying pixel is processed by at least one of the white pixel detection circuit, dark pixel detection circuit, and abnormal sensitivity detection circuit.

3. The circuit of claim 2 wherein the white pixel detection circuit, the dark pixel detection circuit, and the abnormal sensitivity detection circuit process the underlying pixel serially.

4. The circuit of claim 2 wherein at least two of the white pixel detection circuit, the dark pixel detection circuit, and the abnormal sensitivity detection circuit process the underlying pixel in parallel.

5. The circuit of claim 1 wherein the neighboring pixels comprise:
a first group; and
a second group, each group being processed by the defective pixel detection circuit separately.

6. The circuit of claim 5 wherein the first group comprises a first plurality of pixels immediately surrounding the underlying pixel.

7. The circuit of claim 5 wherein the second group comprises a second plurality of pixels immediately surrounding the first group.

8. The circuit of claim 5 wherein the first and second groups form a rectangular shape.

9. The circuit of claim 5 wherein the first and second groups form a diamond shape.

10. The circuit of claim 5 wherein the first and second groups incorporate the Bayer pattern.

11. The circuit of claim 1 wherein the pixel value restoration circuit comprises a line-edge feature detection circuit for detecting whether a line or an edge feature passes through the underlying pixel.

12. The circuit of claim 1 wherein the pixel value restoration circuit comprises a spatially adaptive interpolation filter for deriving a restoration value.

13. The circuit of claim 1 wherein the sensor is a CCD/CMOS sensor.

14. A method for processing pixel defects in a sensor, the method comprising:
measuring a value of an underlying pixel;
determining whether the underlying pixel is defective;
deriving a restoration value from values of neighboring pixels if the underlying pixel is defective; and
replacing the value of the underlying pixel with the restoration value; wherein the determining comprises at least one of the following types of assessing:
assessing whether the underlying pixel is stuck high;
assessing whether the underlying pixel is stuck low; and
assessing whether the underlying pixel is abnormally sensitive; and
wherein the underlying pixel is processed serially such that a first type of assessing is followed by a second type of assessing if no defect is found during the first type of assessing, and wherein the second type of assessing is followed by a third type of assessing if no defect is found during the second type of assessing.

15. The method of claim 14 wherein at least two of the types of assessing are processed in parallel.

16. The method of claim 14 wherein the determining further comprises grouping the neighboring pixels into at least a first group and a second group, the first group and the second group being processed separately;
wherein the assessing whether the underlying pixel is stuck high further comprises:
comparing the value of the underlying pixel with a white threshold value; and
calculating a difference value if the value of the underlying pixel is greater than the white threshold value, the difference value being derived from comparing the underlying pixel with the first group, wherein the underlying pixel is declared to be stuck high if the difference value is greater than the white threshold value;
wherein the assessing whether the underlying pixel is stuck low further comprises:
comparing the value of the underlying pixel with a dark threshold value; and
calculating a difference value if the value of the underlying pixel is less than the dark threshold value, the difference value being derived from comparing the underlying pixel with the first group, wherein the underlying pixel is declared to be stuck low if the difference value is greater than the dark threshold value;
wherein the assessing whether the underlying pixel is abnormally sensitive further comprises:
comparing the value of the underlying pixel with a projected value, the projected value being derived from the second group, wherein the underlying pixel is declared to be an abnormal pixel if the value of the underlying pixel varies from the projected value beyond a certain percentage.

17. The method of claim 16 wherein the first group comprises a first plurality of pixels that immediately surround the underlying pixel.

18. The method of claim 16 wherein the second group comprises a second plurality of pixels that immediately surround the first group.

19. The method of claim 18 wherein the second group comprises the first group.

20. The method of claim 16 wherein the first group and the second group are the same.

21. The method of claim 14 further comprising detecting whether a line or an edge feature passes through the underlying pixel if determined to be defective.

22. The method of claim 21 wherein the step of detecting is achieved with a line-edge feature algorithm.

23. The method of claim 14 wherein the restoration value is derived from the values of the neighboring pixels using one-dimensional extrapolation.

24. The method of claim 14 wherein the restoration value is derived from the values of the neighboring pixels using two-dimensional extrapolation.

25. The method of claim 14 wherein the step of replacing is achieved with a spatially adaptive interpolation filter.

26. The method of claim 14 wherein the replacing comprises applying a spatially adaptive interpolation along the direction of a line or edge feature if detected.

* * * * *

UNITED STATES PATENT AND TRADEMARK OFFICE
CERTIFICATE OF CORRECTION

| | |
|---|---|
| PATENT NO. | : 6,985,180 B2 |
| APPLICATION NO. | : 09/884284 |
| DATED | : January 10, 2006 |
| INVENTOR(S) | : Chang et al. |

Page 1 of 1

It is certified that error appears in the above-identified patent and that said Letters Patent is hereby corrected as shown below:

In the claims, column 9, line 32, "a" should be changed to --the--.

In the claims, column 10, line 44, "step of" should be deleted.

In the claims, columns 10, line 53, "step of" should be deleted.

Signed and Sealed this

Twenty-second Day of August, 2006

JON W. DUDAS
*Director of the United States Patent and Trademark Office*